US005701588A

United States Patent [19]

Morita et al.

[11] Patent Number: 5,701,588

[45] Date of Patent: Dec. 23, 1997

[54] PICTORIAL DISPLAY APPARATUS FOR RECEIVERS FOR IMPLEMENTING THE PICTORIAL DISPLAY

[75] Inventors: Kazuo Morita; Motoki Ide, both of Tokyo, Japan

[73] Assignee: NEC Corporation, Tokyo, Japan

[21] Appl. No.: 350,983

[22] Filed: Nov. 29, 1994

[30] Foreign Application Priority Data

Nov. 30, 1993 [JP] Japan .................................. 5-299978

[51] Int. Cl.[6] ................................................ H04Q 7/14

[52] U.S. Cl. ......................... 455/38.4; 455/38.1; 455/89; 455/145; 455/154.1; 455/156.1; 340/825.44; 379/52

[58] Field of Search ................................ 455/38.4, 38.1, 455/89, 351, 145, 154.1, 154.2, 155.1, 156.1, 157.1, 157.2, 158.4, 158.5, 159.1, 38.5, 38.2; 340/311.1, 825.44, 825.46, 825.48; 345/35; 341/27; 84/454, 457; 379/52, 376

[56] References Cited

U.S. PATENT DOCUMENTS

| | | | |
|---|---|---|---|
| H1173 | 4/1993 | Davis et al. | 455/38.1 |
| 4,868,561 | 9/1989 | Davis | 340/311.1 |
| 4,975,693 | 12/1990 | Davis et al. | 340/825.44 |
| 5,192,947 | 3/1993 | Neustein | 340/311.1 |
| 5,463,368 | 10/1995 | Tsunoda et al. | 340/825.44 |

*Primary Examiner*—Reinhard J. Eisenzopf
*Assistant Examiner*—Doris To
*Attorney, Agent, or Firm*—Sughrue,Mion,Zinn,Macpeak & Seas, PLLC

[57] ABSTRACT

In selecting at least one of plural informing mechanisms as a selected informing mechanism, a waveform symbol is displayed on an LCD representing the selected informing mechanism. The waveform symbol expresses the sound pattern for indicating reception of a call signal.

11 Claims, 4 Drawing Sheets

PICTORIAL DISPLAY APPARATUS FOR RECEIVERS FOR IMPLEMENTING THE PICTORIAL DISPLAY

BACKGROUND OF THE INVENTION

1. Field of the Invention

The present invention relates to a display apparatus and method of display and, more particularly, to a display apparatus and corresponding method of display for a selective call receiver.

2. Description of the Related Art

A conventional selective call receiver, such as a pager receiver, includes a display unit and has a plurality of informing mechanisms for informing a user that a call signal has been received. Such informing mechanisms may include a single beep sound or musical beep sound from a speaker, or a vibration produced by a vibrator. In the conventional selective call receiver, at least one of these informing mechanisms is selected as a selected informing mechanism using a selector, e.g., a user activated switch. When the user selects one informing mechanisms using the switch, letters, numerals or marks are displayed to indicate, on the display unit, the selected informing mechanism.

FIGs. 1(*a*) to 1(*c*) illustrate examples of such displays. FIG. 1(*a*) illustrates the case in which only intermittent beeps are sounded, and letters "B", "E", "E" and "P" and a mark indicating the beeps are displayed. FIG. 1(*b*) illustrates the case in which the intermittent beeps are varied musically, and letters "A", "L", "E", "R" and "T" and another mark " " indicating the musical beeps are displayed. FIG. 1(*c*) illustrates the case in which the vibrator is selected, and letters "S", "T", "L", "E", "N", "T" and a mark indicating the vibration are displayed.

Recently, however, along with the growing multi-functionalization of hardware, the variety of displays on the display unit has increased making it difficult to distinguish different modes. Moreover, as the content of display used to indicate the selected informing mechanism is expressed in letters or numerals, confusion with some other display is apt to occur in selecting an informing mechanism, thereby inviting erroneous operation. For example, a code of a received message is displayed in a message receiving mode on the display unit as shown in FIG. 2(*a*) or a present time is displayed on the display unit in a time mode as shown in FIG. 2(*b*). Comparing the displays shown in FIGS. 2(*a*) and 2(*b*) with a display shown in FIG. 2(*c*) which indicates a part of FIG. 1(*a*), it is noted that each display is similar and thus confusion possible.

Furthermore, when there are several kinds of sounds in one informing mechanisms, for instance, several kinds of beep sounds, it is difficult for the user to distinguish one from the others.

SUMMARY OF THE INVENTION

It is therefore an object of the present invention to provide a display apparatus and method of display capable of distinguishing a displayed character from others, thereby reducing erroneous operation.

Another object of the present invention is to provide a display apparatus and method of display which reduces the possibility of selecting a wrong informing mechanism.

It is a further object of the present invention to provide a selective call receiver with a display unit permitting ready distinction between the display pattern for use in the selection of an informing mechanism and any other display, and thereby reduce the risk of erroneous operations.

It is still further object of the present invention to provide a selective call receiver capable of reducing the possibility of selecting a wrong informing mechanism.

A display apparatus, according to the present invention, is for displaying a selected informing mechanism, and includes a switch for selecting one of a plurality of informing mechanisms as the selected informing mechanism and a display for displaying a graphic, preferable waveform shaped symbol indicating the selected informing mechanism.

A display method, according to the present invention, for controlling a display pattern for indicating a selected informing mechanism, includes, (1) selecting one of a plurality of informing mechanisms for informing a user of a reception of a call signal, and (2) displaying, on the display, a graphic symbol indicating the selected informing mechanism.

BRIEF DESCRIPTION OF THE DRAWINGS

The above and other objects, features and advantages of this invention will become more apparent from the following detailed description taken with the accompanying drawings in which.

In the drawings, the same reference numerals denote the same structural elements.

DESCRIPTION OF THE PREFERRED EMBODIMENT

Now a preferred embodiment of the present invention will be described in detail with reference to FIGS. 3 to 6.

Figure 1A:
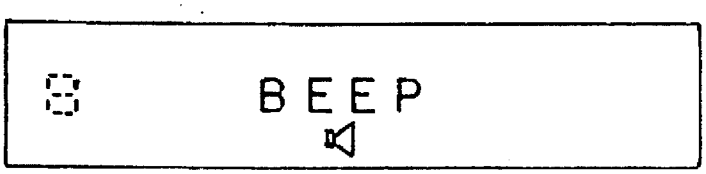
FIG.1(a) (PRIOR ART)
FIGs. 1(*a*)–1(*c*) illustrate examples of displayed characters in a conventional radio selective call receiver.
Figure 1B:
FIG.1(b) (PRIOR ART)
Figure 1C:
FIG.1(c) (PRIOR ART)
Figure 2A:
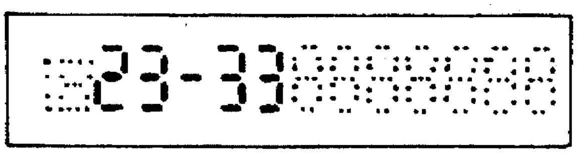
FIG.2(a) (PRIOR ART)
FIGS. 2(*a*)–2(*c*) illustrate examples of displayed characters of each mode in a conventional radio selective call receiver.
Figure 2B:
FIG.2(b) (PRIOR ART)
Figure 2C:
FIG.2(c) (PRIOR ART)
Figure 3:
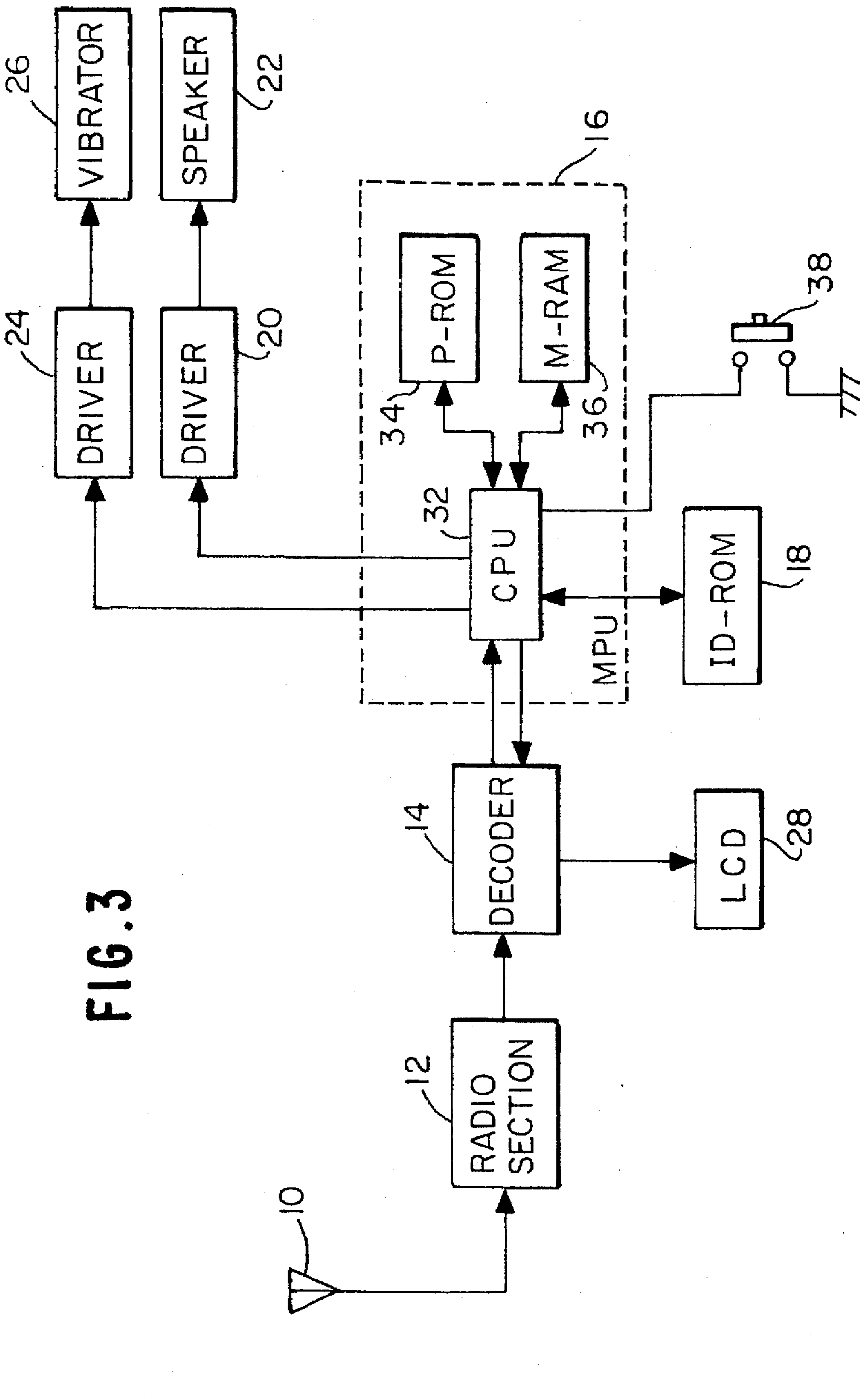
FIG. 3 is a block diagram of a radio selective call receiver having a display means according to one embodiment of the present invention.
Figure 4A:
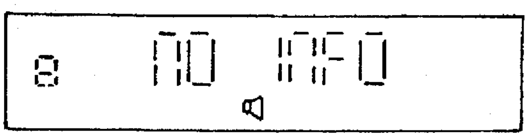
FIGS. 4(*a*)–4(*e*) illustrate examples of displays on a liquid crystal display (LCD) according to the present invention.
Figure 4B:
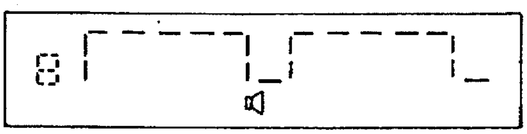
Figure 4C:
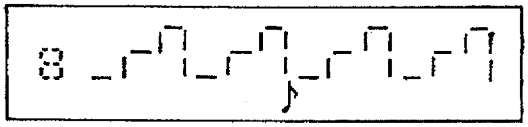
Figure 4D:
Figure 4E:
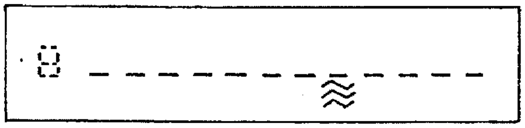

FIG. 3 is a block diagram of a radio selective call receiver having a display means according to one embodiment of the present invention.

In FIG. 3, a call signal from a base station (not shown) received by an antenna 10 is supplied to a radio section 12 in which the received call signal is demodulated, waveform shaped, and converted into a digital signal. A decoder 14 checks an identification (ID) code contained in the received call signal with a pre-assigned ID code which is read out from an ID code memory (ID-ROM) 18 and is pre-set into the decoder 14 by a microprocessor (MPU) 16. If the received ID code is coincident with the pre-assigned ID code, the decoder 14 decodes a message signal contained in the received call signal and supplies a decoded message signal to the MPU 16.

The MPU 16 consists of a central processing unit (CPU) 32, a program memory (P-ROM) 34 in which several kinds of control signals are stored, and a message memory (M-RAM) 36 into which the decoded message signal is programmed. The MPU 16 stores the decoded message signal in the M-RAM 36, and drives one of a number of notifying devices to inform the user of the call; e.g., drives a loudspeaker 22 through a first driver 20 or a vibrator 26 through a second driver 24. In addition, the MPU 16 displays the received message on a liquid crystal display (LCD) 28 through the decoder 14 which includes a LCD driver.

A switch 38 is a push switch and functions to execute selection of an informing mechanism. Namely, the switch 38 selects one of the informing mechanisms.

In a preferred embodiment, four informing mechanisms are provided. A first informing mechanism, having a first sound pattern, issues simple beeps in accordance with the first sound pattern. A second informing mechanism, having a second sound pattern, issues beeps which are varied musically in accordance with the second sound pattern. A third informing mechanism, having a third sound pattern, issues chirps which consist of a combination of beeps and vibrations in accordance with the third sound pattern. A fourth informing mechanism, generates vibrations instead of beeps and issues no sounds.

In the first and second informing mechanisms, the loudspeaker 22 is selected. On the other hand, the vibrator 26 is selected in the fourth informing means. In the third informing means, the loudspeaker 22 and the vibrator 26 are selected.

FIGS. 4(*a*) to 4(*e*) illustrate the above-identified types of display on the LCD 28. FIG. 4(*a*) illustrates a display on the LCD 28 representing a stand-by mode. FIG. 4(*b*) illustrates a case in which a waveform visually expressing the first sound pattern and a mark indicating a beep are displayed as the display pattern representing the first informing mechanism. FIG. 4(*c*) illustrates a case in which a waveform visually expressing the second sound pattern and a mark indicating a musical beep are displayed as the display pattern representing the second informing mechanism. FIG. 4(*d*) illustrates a case in which a waveform visually expressing the third sound pattern and a mark indicating a chirp are displayed as the display pattern representing the third informing mechanism. FIG. 4(*e*) illustrates a case in which a waveform visually expressing the fourth pattern and a mark indicating a vibration are displayed as the display content representing the fourth informing mechanism. In the above-mentioned preferred embodiment, although the marks are also displayed, such marks are not necessary according to the teachings of the invention.

As will be evident from the following description, any one of these informing mechanisms can be selected as a selected informing mechanism by the switch 38. Therefore, the switch 38 functions as a selecting means and the LCD 28 as a display for the graphical display of the design representing the selected informing mechanism.

Figure 5:
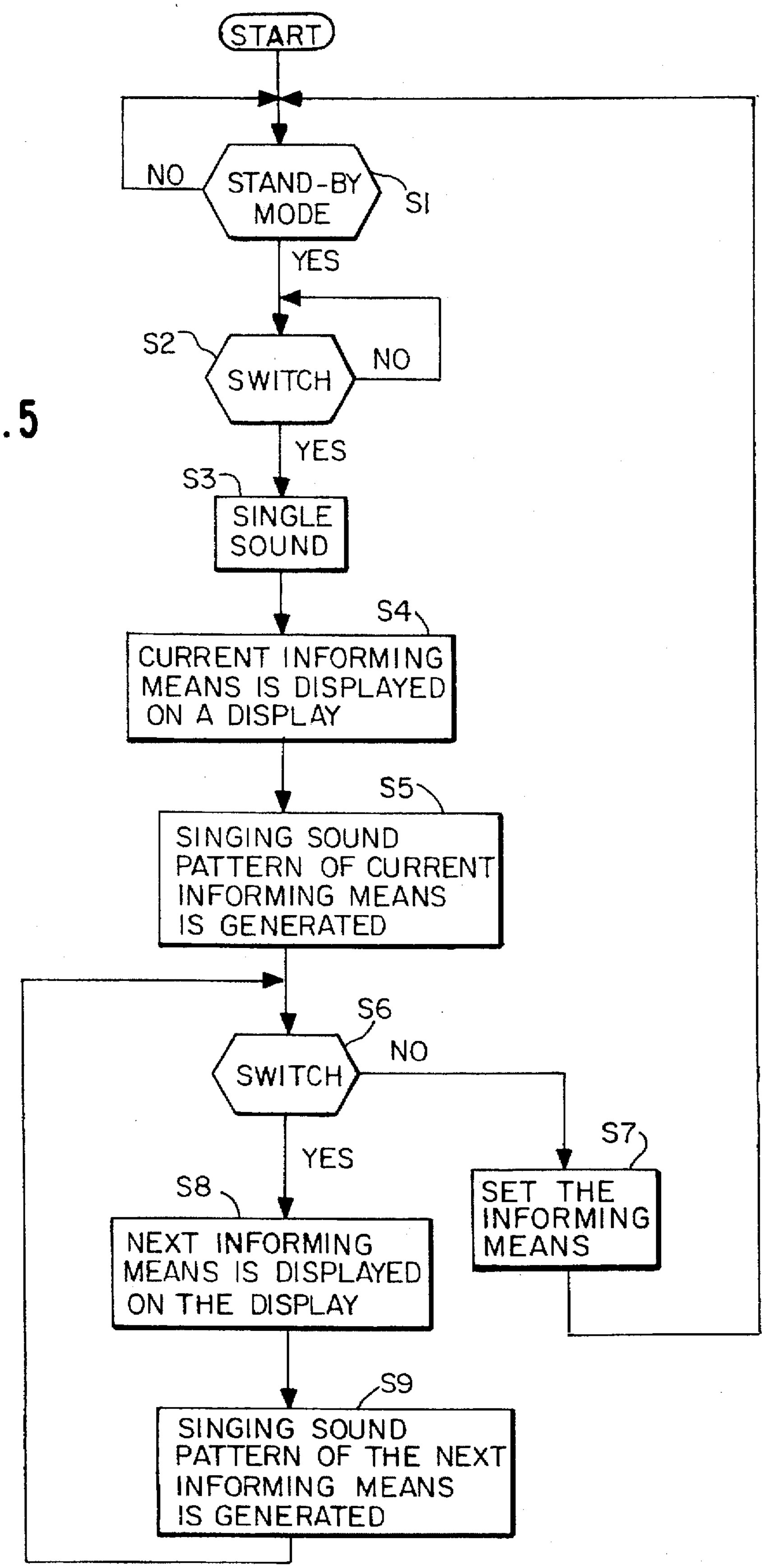
FIG. 5 is a flow-chart for describing an operation for selecting one notifying device and informing mechanism according to the present invention.

FIG. 5 is a flow-chart for describing the selecting operation for selecting the informing mechanism. Referring to FIGS. 3 to 5 together, in a first step S1, the CPU 32 judges whether the receiver is in the stand-by state in which the call signal can be received. If the receiver is in the stand-by state in the first step S1, the CPU 32 judges whether or not the switch 38 has been operated in a step S2. If the switch 38 is pressed down for a first predetermined time, preferably 1.5 seconds, the CPU 32 cause the loudspeaker 22 to issue a single sound once in a step S3.

In a fourth step S4, a display pattern representing the currently selected informing mechanism is indicated on the LCD 28. For instance, if the first informing mechanism is currently selected, the waveform visually expressing the first sound pattern with or without the mark indicating the beep is displayed on the LCD 28. In a fifth step S5, a sound pattern in current use, for instance a sound according to the first sound pattern, is issued by the loudspeaker 22.

At the sixth step S6, it is judged whether or not the switch 38 has been pressed down within a second predetermined time, preferably, two seconds, after a display pattern was displayed on the LCD 28. If the switch 38 remains unpressed for two seconds while a display pattern is displayed on the LCD 28, the CPU 32 sets the informing mechanism corresponding to the display pattern the LCD 28 then set as the selected informing mechanism in a step S7, and enters into the stand-by mode. For instance, if the switch is not pressed within two seconds from the display of the first informing mechanism, the first informing mechanism is set as the selected informing mechanism.

If, in step S6, the switch 38 is pressed down within two seconds after a display pattern was displayed on the LCD 28, the CPU 32 displays on the LCD 28 a display pattern representing the next informing mechanism in a step S8. For instance, a waveform visually expressing the second sound pattern is displayed on the LCD 28 as a display pattern. The CPU 32 causes the loudspeaker 22 to issue a musical beep following the second sound pattern in a step S9, and returns to the sixth step S6. Incidentally, the foregoing operations are produced by the CPU 32.

Figure 6A:
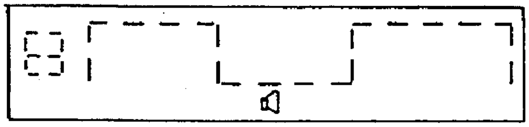
FIGS. 6(*a*)–6(*c*) illustrate other types of the displays according to another embodiment of the present invention.
Figure 6B:
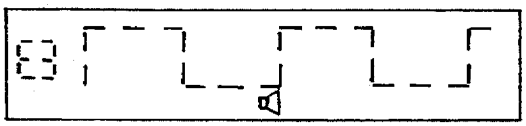
Figure 6C:
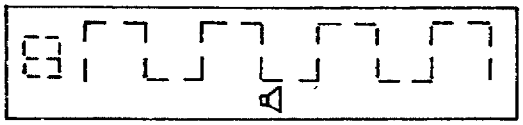

FIGS. 6(*a*)–6(*c*) illustrate other types of displays on the LCD 28 in another preferred embodiment according to the present invention. In this preferred embodiment, there are three other kinds of sound patterns formed from beeps.

FIG. 6(*a*) illustrates a case in which a waveform visually expressing a fifth sound pattern and a mark indicating the beep are displayed as display pattern representing a fifth informing mechanism. FIG. 6(*b*) illustrates a case in which a waveform visually expressing a sixth sound pattern and the mark indicating the beep are displayed as a display pattern representing a sixth informing mechanism. FIG. 6(*c*) illustrates a case in which a waveform visually expressing a seventh sound pattern and the mark indicating the beep are displayed as a display pattern representing a seventh informing mechanism.

As described before, even though there are several different sound patterns available as informing mechanisms, the user can easily distinguish one from the other.

Although the foregoing description referred to seven informing mechanisms, obviously the present invention is not so restricted, but can as well be embodied in a configuration having any number of informing mechanisms. In addition, this invention is not limited in use to a selective call receiver. Moreover, the switch may take the form of a plurality of switches.

As hitherto described, according to the present invention, the display apparatus and method of display disclosed herein permits ready distinction between the display pattern for use in the selection of an informing mechanism and any other character display, and accordingly reduces the risk of erroneous operations.

Further, by using graphical symbol, such as a waveform, visually expressing a sound pattern as the informing mechanism at the time of selecting the informing mechanism, the content can be more readily perceived by the user as compared to a character display, and therefore the possibility of selecting a wrong informing mechanism is reduced.

Although the embodiments described herein have been described with respect to a specific arrangement, it goes without saying that the present invention is not restricted to such specific arrangements.

What is claimed is:

1. A device, having a plurality of informing mechanisms, at least some of said informing mechanisms generating a sound pattern, for displaying a visual pattern representing a selected informing mechanism, comprising:

a switch for selecting one of said plurality of informing mechanisms as said selected informing mechanism; and a display for displaying a waveform sound pattern visually expressing the sound pattern generated by the selected informing mechanism;

wherein said plurality of informing mechanisms comprise:

first informing means, having a first sound pattern, for issuing beeps in accordance with said first sound pattern;

second informing means, having a second sound pattern, for issuing beeps varied musically in accordance with said second sound pattern;

third informing means, having a third sound pattern, for issuing chirps in accordance with said third sound pattern; and fourth informing means for generating vibrations and no sounds.

2. The device as claimed in claim 1, further comprising: notifying means for generating said sound patterns.

3. The device as claimed in claim 2, wherein said informing mechanisms further comprise:

fifth informing means, having a fifth sound pattern, for issuing beeps in accordance with said fifth sound pattern;

sixth informing means, having a sixth singing sound pattern, for issuing beeps in accordance with said sixth singing sound pattern; and seventh informing means, having a seventh sound pattern, for issuing beeps in accordance with said seventh sound pattern.

4. A radio selective call receiver displaying a selected informing mechanism on a display, comprising:

a plurality of informing mechanisms for informing a user of a reception of a call signal, at least some of said informing mechanisms generating a sound pattern to indicate said reception of said call signal;

a switch for selecting one of said plurality of informing mechanisms as a selected informing mechanism; and control means for causing a display on said display of a waveform sound pattern visually expressing the sound pattern generated by the selected informing mechanism.

5. The radio selective call receiver as claimed in claim 4, further comprising:

a radio section for converting said call signal into a digital signal after demodulating and shaping;

a plurality of notifying means for generating informing mechanisms;

a memory for storing a message contained in said call signal; and display means for displaying said message on said display.

6. The radio selective call receiver as claimed in claim 4, wherein said plurality of informing mechanism comprise:

first informing means, having a first sound pattern, for issuing beeps in accordance with said first sound pattern;

second informing means, having a second sound pattern, for issuing beeps which vary musically in accordance with said second sound pattern;

third informing means, having a third sound pattern, for issuing chirps in accordance with said third sound pattern; and fourth informing means for generating vibrations and no sounds.

7. The radio selective call receiver as claimed in claim 6, wherein said informing mechanisms further comprise:

fifth informing means, having a fifth sound pattern, for issuing beeps in accordance with said fifth sound pattern;

sixth informing means, having a sixth sound pattern, for issuing beeps in accordance with said sixth sound pattern; and seventh informing means, having a seventh sound pattern, for issuing beeps in accordance with said seventh sound pattern.

8. A method for controlling the display pattern of a display for indicating a selected informing mechanism, the method comprising the steps of:

selecting one of a plurality of informing mechanisms for informing a user of a reception of a call signal, some of said informing mechanisms producing a sound pattern to inform said user of said reception of said call signal; and displaying a waveform sound pattern visually expressing the sound pattern generated by said selected informing mechanism.

9. The method for controlling as claimed in claim 8, the method further comprising the steps of:

notifying a user of said sound pattern in said selected informing mechanism after said selecting.

10. A method for controlling a display pattern on a display for indicating a selected informing mechanism, the method comprising the steps of:

judging whether a switch is pressed for a first predetermined-time;

generating a first sound when said switch is pressed for said first predetermined time;

displaying a presently selected informing mechanism;

generating a sound pattern corresponding to presently selected informing mechanism;

judging whether said switch is pressed for a second predetermined time;

maintaining said displayed presently selected informing mechanism as said selected informing mechanism when said switch is not pressed for said second predetermined time;

displaying another informing mechanism having another sound pattern on said display when said switch is pressed for said second predetermined time; and generating said another sound pattern of said another informing mechanism.

11. A device for indicating a reception of a call signal, comprising:

a plurality of informing mechanisms for informing a user of the reception of the call signal, some of said informing mechanisms producing a sound pattern to inform said user of said reception of said call signal;

selection means for selecting one of said plurality of informing mechanisms; and display means for displaying a waveform sound pattern visually expressing the sound pattern generated by said selected informing mechanism.

* * * * *